Aug. 5, 1969  R. E. CONOVER  3,459,073
ROCK BIT ASSEMBLY AND BIT INSERT ASSEMBLY PROCESS
Filed June 12, 1967  2 Sheets-Sheet 1
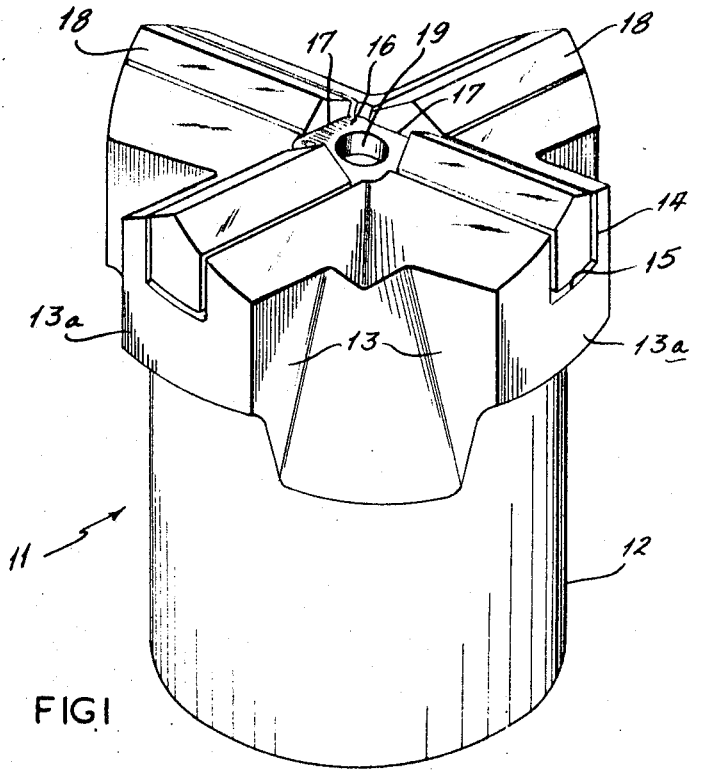
FIG 1
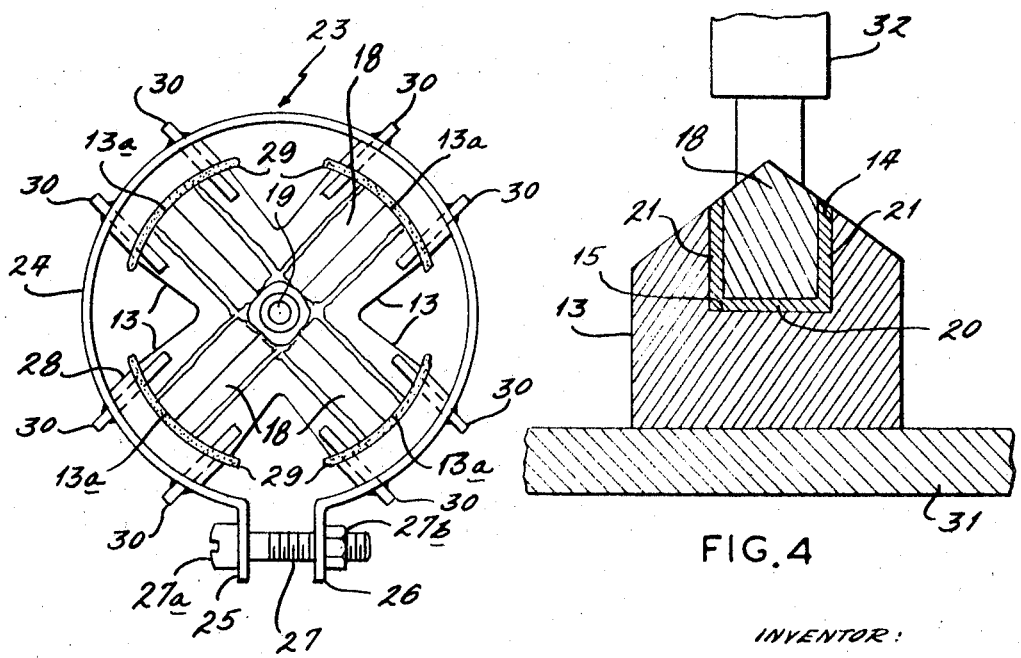
FIG.2
FIG.4
INVENTOR:
ROBERT E. CONOVER
BY
Gravely, Lieder & Woodruff
ATTORNEYS.

Aug. 5, 1969   R. E. CONOVER   3,459,073
ROCK BIT ASSEMBLY AND BIT INSERT ASSEMBLY PROCESS
Filed June 12, 1967   2 Sheets-Sheet 2

INVENTOR:
ROBERT E. CONOVER
BY
Gravely, Lieder & Woodruff
ATTORNEYS.

United States Patent Office 3,459,073
Patented Aug. 5, 1969

3,459,073
ROCK BIT ASSEMBLY AND BIT INSERT
ASSEMBLY PROCESS
Robert E. Conover, Colorado Springs, Colo., assignor to
The Timken Roller Bearing Company, Canton, Ohio,
a corporation of Ohio
Filed June 12, 1967, Ser. No. 645,137
Int. Cl. B21k 5/02
U.S. Cl. 76—108                                          10 Claims

ABSTRACT OF THE DISCLOSURE

A rock bit insert assembly in which the inserts are secured in the slots of the body of the bit by a brazing alloy composition that relieves brazing stresses, and in which the assembly of the inserts in the bit body is achieved by an improved process that avoids loss of brazing alloy, distributes the brazing alloy in a uniform manner, and substantially eliminates the need for adding additional alloy.

---

This invention relates to improved rock bit assemblies and to a method or process for assembly of the inserts in the body slots of the rock bit.

The problem attendant with the assembly of inserts in rock bit body slots is that excess space between the sides of the inserts and slot side walls allows the brazing alloy to flow easily outwardly of the slots where it is lost. This requires additions of alloy which usually introduces stress factors that reduces the useful life of the bit. Obviously the loss of alloy increases the production costs.

It is an important object of this invention to provide an improved rock bit having a relatively stress free and a stronger bond in the joint between the bit body and the insert.

It is another object of this invention to provide an improved method or process for securing inserts in rock bit bodies.

Another object of this invention is to provide a rock bit insert assembly process in which a wide gap can be tolerated between the insert and the body slots so that the brazing alloy will better serve as a stress relieving medium between the insert and the bit body.

Still a further object of this invention is to provide an improved process for brazing inserts in rock bit body slots that will eliminate the expensive outside diameter grinding or recontouring steps now required by known processes.

Still another object of this invention is to provide an improved process for manufacturing rock bits having brazed inserts, wherein a considerable saving in the usage of brazing alloy is realized.

Other objects and attendant advantages of the present invention will be set forth in the following disclosure of certain preferred embodiments, reference being had to the drawings, wherein:

FIG. 1 is a perspective view of a rock bit prior to undergoing the processing which forms a part of the present invention;

FIG. 2 is a top plan view of a rock bit of the type seen in FIG. 1, but after the heating stage;

FIG. 4 is a view similar to FIG. 3, but showing a pressing step in the process of assembling the insert in final position;

Figure 3:
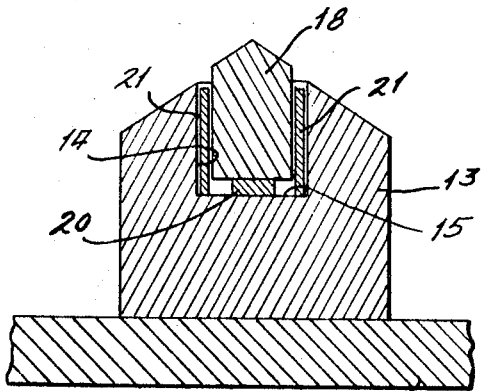
FIG. 3 is a transverse sectional view of a typical portion of the rock bit in FIG. 1 to show certain important details.

Turning now to FIGS. 1 and 2, it can be seen that the rock bit 11 of this invention has a skirted body 12 formed with four wings 13 arranged in pairs and oppositely directed in crossed relationship. Each of the wings is provided with a slot 14 having substantially parallel upwardly directed sidewalls and a bottom surface 15. The slots 14 of the oppositely aligned wings 13 are in alignment and the inner ends of the slots open into a central cavity which is normally occupied by a suitable retaining plug 16 having appropriate surfaces 17 which act as abutment for the inner ends of the respective bit inserts 18 which may be made of tungsten carbide. The plug is formed with a central aperture 19 which communicates with a bore (not shown) in the skirted body 12 of the rock bit. Such a bore is provided in order to conduct water or other fluid into the bottom of the hole being drilled by the rock bit, such fluid issuing from the aperture 19 in the retaining plug 16.

Referring now to FIGS. 2 and 3 in particular, it is typically shown that the insert 18 positioned in slot 14 rests on a prepositioned and presized slug of brazing alloy material 20. This is a typical preliminary assembly step with respect to each of the inserts 18. It is also typical that the insert 18 is centrally positioned between the vertical sidewalls of the slot 14 by means of spacer shims 21 which are of limited length relative to the length of the slot 14 as measured from the abutment wall 17 on the retaining plug 16 outwardly through the curved end face 13a of the wing 13.

After each insert 18 has been mounted in its respective slot 14 as shown in FIG. 3, the rock bit with its inserts is then mounted in a brazing fixture 23 as is shown in FIG. 2. The brazing fixture includes a strap like body 24 which encircles the end faces 13a of the rock bit wings 13 and has its opposite ends 25 and 26 suitably formed to receive a tightening screw 27 so that the circumferential dimension of the strap 24 can be reduced by turning the head 27a of the screw relative to the nut 27b. At four equidistant locations around the circumference of the fixture strap 24 there are mounted suitable pressude pads 28 and asbestos shims 29 which act as facing pieces for the pads 28. Each pressure pad 28 is slideably mounted on a pair of slide pins 30 that are spaced apart but firmly secured in the fixture strap 24. These mounting pins are also of sufficient length to extend radially inwardly over the top surface of the rock bit wings 13 so that the fixture 23 may be located from the top slanted wing surfaces at each side of the inserts 18. The pressure pads 28 and the asbestos facing shim are removable from the fixture so that other thicker or thinner components may be utilized to accommodate different rock bit body sizes.

Once the rock bit 11 has been completely assembled with the brazing alloy slugs 20 and the inserts 18 (FIG. 3), and the brazing fixture has been properly placed (FIG. 2), the assembly is ready to be placed in the heating furnace where its temperature is brought up to the desired level to reduce the slugs 20 to a molten condition so that the alloy will flow across the bottom surface 15 of the slots 14 and move upwardly between the vertical sidewalls of the slot 14 and the adjacent surfaces of the inserts 18. It is known that if the difference in width between the sidewalls of the slot 14 and the thickness of the insert 18 is of the order of .005 inch, then the theoretical gap on each side is one-half, or .0025 inch, and in a gap of the latter size molten brazing alloy will have a tendency to stand in a column and be retained in the gap space by capillary action. It is not always possible or desirable to maintain a gap space of .0025 inch, and oftentimes the joint space is of the order of .010 inch or larger, and when this gap space is encountered the molten brazing alloy will very quickly flow outwardly through the opening in the end face 13a of each wing.

To prevent the loss of molten alloy in this manner it can be seen that the fixture 23 provides a blocking dam over each wing face 13a in the form of the asbestos shim 29. Each face 13a has such a blocking dam backed up by the pressure pad 28 which is of substantially the same physical size and is also somewhat larger in area than the wing face 13a. The fit of the blocking dam over each of the end faces 13a of the wings is assured by reason of forming the fixture 23, and particularly the strap 24 thereof of low expansion material, which may be an iron-nickel alloy. The rock bit body 11 is formed of an alloy steel that, under heating, has a greater coefficient of thermal expansion than the coefficient of expansion for the alloy used in the formation of the fixture strap 24. This differential of thermal expansion characteristic is made use of in the present process to produce a tightening of the blocking dam asbestos shim 29 over the outer end of the wing slots 14 to oppose the loss of the capillary action in the molten brazing alloy when the side spaces are excessive, as well as to opopse loss when the inserts are pressed into final position. This has the advantage of giving the process a remarkable degree of uniformity of distribution of the brazing alloy in the slots along side the tunsten carbide insert 18, thereby resulting in a new level of uniformity of bonding of the inserts to the rock bit body and a much stronger, stress free and shock resistent bond. These good results are obtained also because during the heating process the rock bit body expands at a greater rate than the fixture strap 24 and an extremely secure and tight seal is created by the asbestos shims 29.

As is shown in FIG. 4, after the heating step has reduced the slug of brazing alloy 20 to its desired molten state, the fixture with the rock bit therein is removed from the heating furnace and is immediately placed between the platen 31 and the pressure ram 32 of a suitable press. The ram 32 presses the insert 18 downwardly into the slot 14. Molten alloy will be elevated in the slot side spaces to completely fill these side spaces substantially even with the slanted surfaces of the insert 18 and the slanted surfaces of wing 13.

Figure 5:
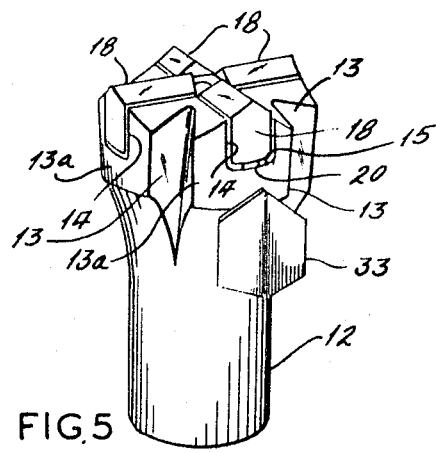
FIG. 5 is a perspective view of a modified rock bit showing the parts thereof partly assembled.

Turning now to FIG. 5, there is shown a perspective view of a rock bit to illustrate a modified assembly therein. In this case the inserts 18 are again set in the wing slots 14 as previously described and a suitable slug of alloy material 20 is placed in the bottom of the respective slots. There is then placed over the end face 13a of each of the wings 13 a gage pad 33. Each pad 33 is formed of a thin piece of shim stock of a thickness of the order of .005 to .007 inch. The gage pad is cut so as to match the contour or end shape of wings 13, and a similar gage pad over each of the end faces 13a is held in place by a fixture of the type shown at 23 in FIG. 2, or by means shown in FIG. 6 which consists of a strip of asbestos material 34 wrapped around the rock bit wings and secured by a plurality of wires 35 having the meeting ends twisted in order to secure an initial snug fit of the asbestos over gage pads 33. The wires 35 are formed of low expansion iron-nickel alloy material so that the rate of expansion thereof on heating is less than the expansion of the rock bit body. The advantage of utilizing lower expansion materials for the wires 35 has been pointed out above.

Figure 6:
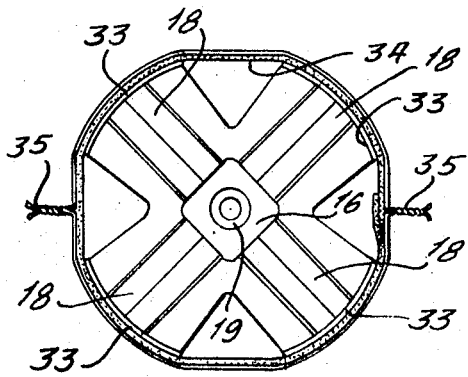
FIG. 6 is a top plan view of the rock bit of FIG. 5 after asembly and before heating and brazing.

After the modified assembly shown in FIGS. 5 and 6 has been completed it is placed in a suitable heating furance and raised to the desired melting point of the brazing alloy slug 20, afterward it is removed and placed between the platen 31 and the ram 32 of a press. The press, of course, is provided with a ram 32 for each of the inserts 18 so that all of the inserts can be pressed into final position simultaneously.

Figure 8:
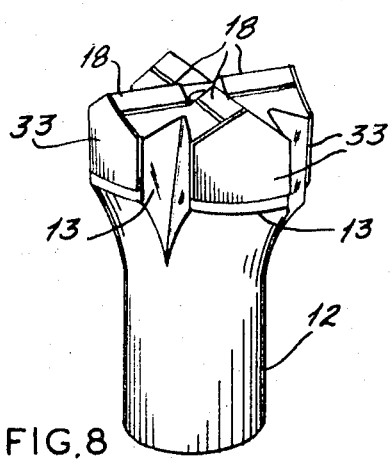
FIG. 8 is a perspective view of a finished rock bit of the character assembled in FIG. 7.

During the heating of the alloy material there will be just enough brazing alloy available to flow in behind the gage pads 33 to result in secure attachment of the gage pads to the wing face surfaces 13a. The wires 35 and the asbestos wrap 34 can be removed after the assembly has cooled satisfactorily. With the gage pads now retained in position as shown in FIG. 8 it is appreciated that it will not be necessary to finish sizing or grind the outer periphery of the rack bit if the initial circumferential sizing of the wing end faces 13a has been accomplished correctly. The gage pads are intended to be of substantial uniform thickness and therefore will not introduce significant variations in the size of the rack bit wings. In this form of the invention the gage pads 33 act as the blocking dams heretofore described above, and also remain in place to finish off the wing end faces so that no grinding or finish sizing operation is required.

Figure 9:
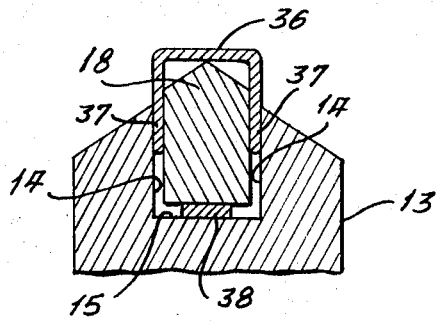
FIG. 9 is a fragmentary sectional view of a modification in the detail of assembly.

In FIG. 9 there is illustrated in a view similar to FIG. 3, another way of centrally locating the insert 18 in the slot 14. In this case the centering means is in the form of one or more steel or soft iron spacing staples 36 which have the opposite legs 37 placed in the gap spaced between the insert 18 and the sidewalls of the slot 14. Again, a predetermined sized slug of brazing alloy material 38 is placed at the bottom surface 15 of the slot 14. It is preferred to use elements 36 for spacing inserts when rock bits get above a certain minimum size.

Figure 10:
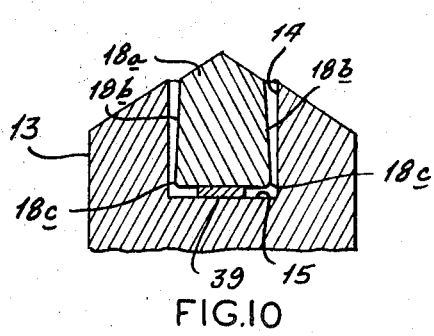
FIG. 10 is a view like FIG. 9 but showing a further modification.

For the common size of rock bits the inserts can be centered as shown in FIG. 10 by forming the opposite sides of the insert 18a with outwardly slanted or diverging sidewalls 18b, while retaining the vertical sides of the slots 14 substantially parallel. This will provide the insert 18a with bottom corners 18c that will retain the insert in substantially central position so that the opposite side spaces are not unbalanced as to the volume of brazing alloy that can be accommodated therein. A suitable slug of brazing alloy material 39 may be placed on the bottom 15 of the slot 14 as described herein before.

Figure 7:
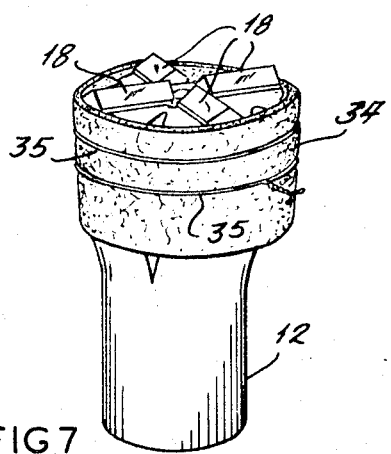
FIG. 7 is a perspective view of the rock bit of FIG. 5 after completion of the assembly of its parts in preparation for the heating thereof.

In the preferred assembly process the rock bit body 11 has the slots 14 milled or broached therein, and after being thus formed all of the surfaces are then cleaned, and the inserts 18 have the surfaces cleaned and fluxed before placement in the slots on top of a predetermined sized slug of alloy material. The alloy material can be silver solder or copper. The inserts are then centered either by the use of shims 21 or by the spacer staples 36, or by the shaped inserts 18 as shown at 18b in FIG. 10. The blocking dams for the brazing alloy are then placed around the wings 13 as shown in either FIG. 2 or 7 and are secured in the position desired before the heating step is undertaken. The heating step can take place in a furnace or by induction coil heating. Following the heating step the assembly is placed in a press where a predetermined amount of pressure is exerted on the gabled or slanted cutting edges of the insert 18 to force the insert down in the slot 14 and assure the flow and distribution of the molten brazing alloy around the sides thereof, leaving a minimum layer at the bottom surface 15. The pressure on the inserts is maintained until the alloy has solidified, thereby assuring a strong bond. During the application of pressure it has been found in connection with the modification shown in FIG. 7 that a small amount of brazing material will be forced outwardly between the gage pads and the surface 13a of the rock bit body, so that the resulting bond between these surfaces will cause the gage pads 33 to become a permanent part of the finished rock bit.

The present process of assembly has been successfully followed in stopping the outward flow of molten copper brazing alloy at temperatures up to about 2100° F. To retain the brazing alloy in this range of heating temperatures the gage pads 33 should be made of a heat resistant stainless steel and have a thickness of the order of .008 to .010 inch. When brazing with silver solder in the range of 1500° F. to 1700° F. gage pads 33 may be formed of mill steel having thicknesses in the range of .005 inch.

The foregoing description has set forth certain preferred embodiments of the present invention which are fully expressive of the invention which are fully expressive of the invention herein made. However, once the details of the invention have become known and appreciated it may occur to those skilled in the art how to perform the invention in certain modified arrangements, and it is the purpose herein to include within the spirit and scope of the appended claims all possible modified arrangements.

What is claimed is:

1. A rock bit assembly comprising an elongated body having a plurality of wings adjacent one end, each wing having a slot therein opening radially and axially of said body, bit elements placed in each of said body slots and spaced from the sides of the slots, a heat flowable brazing alloy slug in each body slot, dam means placed over each axial slot opening, and retainer means engaging said dam means and surrounding said body, said body and retainer means being formed of materials having different coefficients of thermal expansion, whereby said retainer means tightens about said dam means upon heating said assembly to cause said brazing alloy to flow about each bit element in said wing slots.

2. The assembly of claim 1 wherein said brazing alloy slugs upon heating flow into and substantially fill the side spaces of the slots.

3. The assembly of claim 1 wherein said body is formed of a material having a greater coefficient of thermal expansion than said retainer means.

4. The assembly of claim 1 wherein said body is formed of an alloy steel and said retainer means is formed of material having a different coefficient of thermal expansion.

5. The assembly of claim 1 wherein said dam means is formed of material that is substantially indestructable at brazing alloy melting temperatures to close the radially outwardly open spaces between said bit elements and said body slots.

6. The assembly of claim 1 wherein said dam means consists of gauge pads permanently secured to said body wings by said brazing alloy upon melting and flowing thereunder.

7. A method of assembly a bit element in a rock bit which includes the steps of: forming a body with a slot in one end that is axially open through said body end and radially outwardly open at the side of said body; placing a slug of brazing material in said slot; inserting a bit element relatively loosely in said slot adjacent said slug; centering said bit element; closing the radially outwardly open side of said body slot; heating said body and bit element to melt said slug of brazing material; and causing the melted brazing material to flow in said body slot about said bit element prior to solidification thereof for securing the bit element in said body slot.

8. The method of claim 7 wherein the volume of the slug of brazing material is substantially matched to the difference in volumes of the body slot and bit element.

9. The method of claim 7 wherein closing the radially outwardly open side of said body slot includes the additional steps of placing a closure over the open side and applying a holder to the closure until solidification of the brazing alloy secures the closure permanently to the body.

10. The method of claim 9 which includes selecting material for the holder having a lower coefficient of thermal expansion than the rock bit body to tightly retain the closure until the heat of the heating step is substantially dissipated.

References Cited

UNITED STATES PATENTS

| | | | |
|---|---|---|---|
| 2,403,651 | 7/1946 | Fulke | 76—108 XR |
| 3,077,798 | 2/1963 | Baker | 76—108 |

BERNARD STICKNEY, Primary Examiner